United States Patent [19]

Vierikko

[11] Patent Number: 5,082,036
[45] Date of Patent: Jan. 21, 1992

[54] FOREST HARVESTER

[75] Inventor: Pentti Vierikko, Myllykylä, Finland

[73] Assignee: Oy Erco-Mek AB, Solf, Finland

[21] Appl. No.: 623,791

[22] PCT Filed: Jun. 20, 1989

[86] PCT No.: PCT/FI89/00120
§ 371 Date: Dec. 17, 1990
§ 102(e) Date: Dec. 17, 1990

[87] PCT Pub. No.: WO89/12383
PCT Pub. Date: Dec. 28, 1989

[30] Foreign Application Priority Data

Jun. 22, 1988 [FI] Finland .................................. 882995

[51] Int. Cl.$^5$ .............................................. A01G 23/08
[52] U.S. Cl. ...................... 144/3 D; 144/2 Z;
144/34 R; 144/336; 144/338; 144/246 R;
144/246 F
[58] Field of Search ........ 144/2 Z, 3 D, 34 R,
144/34 E, 336, 338, 339, 343, 246 R, 246 F

[56] References Cited

U.S. PATENT DOCUMENTS 4,552,191 11/1985 Kuusilinna .................... 144/34 R
4,881,582 11/1989 Ketonen ....................... 144/34 R Primary Examiner—W. Donald Bray
Attorney, Agent, or Firm—McGlew & Tuttle

[57] ABSTRACT

The invention concerns a forest harvester suspended pivotally at the end of a crane jib (1) and rotatable around its shaft of suspension for felling of a tree trunk and for trimming and possible cutting-off of the tree trunk in the horizontal position. The harvester comprises a suspension arm (3) shaped substantially as an inverted L and a processor unit (4) mounted pivotally at the lower end of the arm, the side of the processor unit (4) placed facing away from the suspension arm (3) being provided with a cross-cutting member (6), with two groups of trimming members (7,8) placed at a distance from one another, and with at least two drive rolls (9, 10) jointly operative with each other, with variable mutual spacing, and mounted between said groups of trimming members. The harvester is characterized by in that the felling movement of the processor unit (4) is arranged to take place towards the side in a vertical plane so that the shafts (9a, 10a) of the drive rolls maintain their substantially horizontal positions all the time.

13 Claims, 4 Drawing Sheets

FOREST HARVESTER

FIELD OF THE INVENTION

The present invention concerns a forest harvester suspended pivotally at the end of a crane jib and rotatable around its shaft of suspension for felling of a tree trunk and for trimming and possible cutting-off of the tree trunk in the horizontal position. The harvester comprises a suspension arm shaped substantially as an inverted L and a processor unit mounted pivotally at the lower end of the arm, the side of the processor unit placed facing away from the suspension arm being provided with a crosscutting member, with two groups of trimming members placed at a distance from one another, and with at least two drive rolls jointly operative with each other, with variable mutual spacing, and mounted between said groups of trimming members.

BACKGROUND OF THE INVENTION

It is a feature common of all prior-art harvesters of the type described above that, during the felling movement, they are arranged to pivot forwards in the direction towards the trimming knives so that, in the horizontal position, the processor unit is placed above the tree trunk and holds its grasp on the trunk only by means of the trimming members or knives. In order that the tree trunk could be kept in its place, it is required that the trimming members in each group are pressed against each other and, thus, against the tree trunk with a very intensive force, because in this position the drive rolls have vertically directed shafts of rotation and press the tree trunk each of them from its side, as a result of which they cannot contribute to supporting of the tree trunk to a significant extent. This has the consequence that the force of friction that has to be overcome by the drive rolls when feeding the tree trunk during the trimming stage becomes enormously high and results therein that the trimming knives cut unduly deep into the wood in the tree trunk, at the same time as the spikes or equivalent friction-increasing members on the drive rolls also tear deep wounds into the wood in the trunk. Thus, a considerable portion of the topmost layer of wood is lost. Since, as a rule, the trimming members cannot keep a tree trunk in a fully stable position during a trimming process, this also results therein that the cutting of the tree trunks in predetermined lengths does not take place precisely, but major variations occur as a result of the fact that the operation of the measuring means that are used for this purpose is disturbed greatly.

SUMMARY AND OBJECTS OF THE INVENTION

The object of the present invention is to eliminate all of the above problems, which is achieved by means of a forest harvester which is characterized in that the felling movement of the processor unit is arranged to take place towards the side in a vertical plane so that the shafts of the drive rolls maintain their substantially horizontal positions all the time.

A suspension arm is pivotally connected to the processor unit and allows the processor unit to pivot from a starting position where the processor unit grasps the tree trunk to a trimming position where the tree has been cut off from the ground and the tree is movable through the processor unit in order for trimming members to remove the branches. In both positions the drive rolls or rollers are horizontal. The weight of the tree is now mainly supported by one of the drive rolls. The two drive rolls are arranged to rest against the tree trunk from opposite sides. The rolls are driven in order to move the tree trunk. One of the drive rolls, preferably the lower drive roll in the trimming position is stationarily mounted on the processor unit and the upper drive roll is adjustably mounted on the processor unit in order to accommodate tree trunks of varying size. It is also possible to have two stationary rollers mounted on the processor unit for contacting one side of the tree trunk and having one side of the adjustable drive roller contacting another side of the tree trunk. These two stationary rollers would be on the lower side of the tree trunk in the trimming position. Having these two stationary rollers gives more support to the tree during trimming. The drive rolls can be driven by hydraulic motors in such a manner that the circumferential velocity of the drive rolls are always equal, thus preventing damage to the tree trunk during movement.

The suspension arm can be mounted to the processor unit in such a way that a small acute angle exists between the suspension arm and the processing unit in the starting position. This small acute angle is chosen so that in the trimming position a connection point of the suspension arm is in line with the center of gravity of the processor unit. A hydraulic cylinder piston device can be coupled between the processor unit and the suspension arm in order to move the processor unit between the starting position and the trimming position. Also a felling flap can be mounted on the bottom of the processor unit in order to tilt the processor unit into the trimming position after the cutting off of the tree. During the trimming of the tree branches, a measuring device attached to the processor unit can record the length of the tree trunk, subsequently cutting the tree trunk into preselected lengths.

The suspension arm can be mounted onto the end of a crane jib by means of a hydraulic rotor and a hydraulic tilting cylinder-piston device. The hydraulic rotor can adjust the rotation of the processor unit around a suspension shaft and the hydraulic tilting cylinder-piston device adjusts the angle between the crane jib and the suspension arm.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
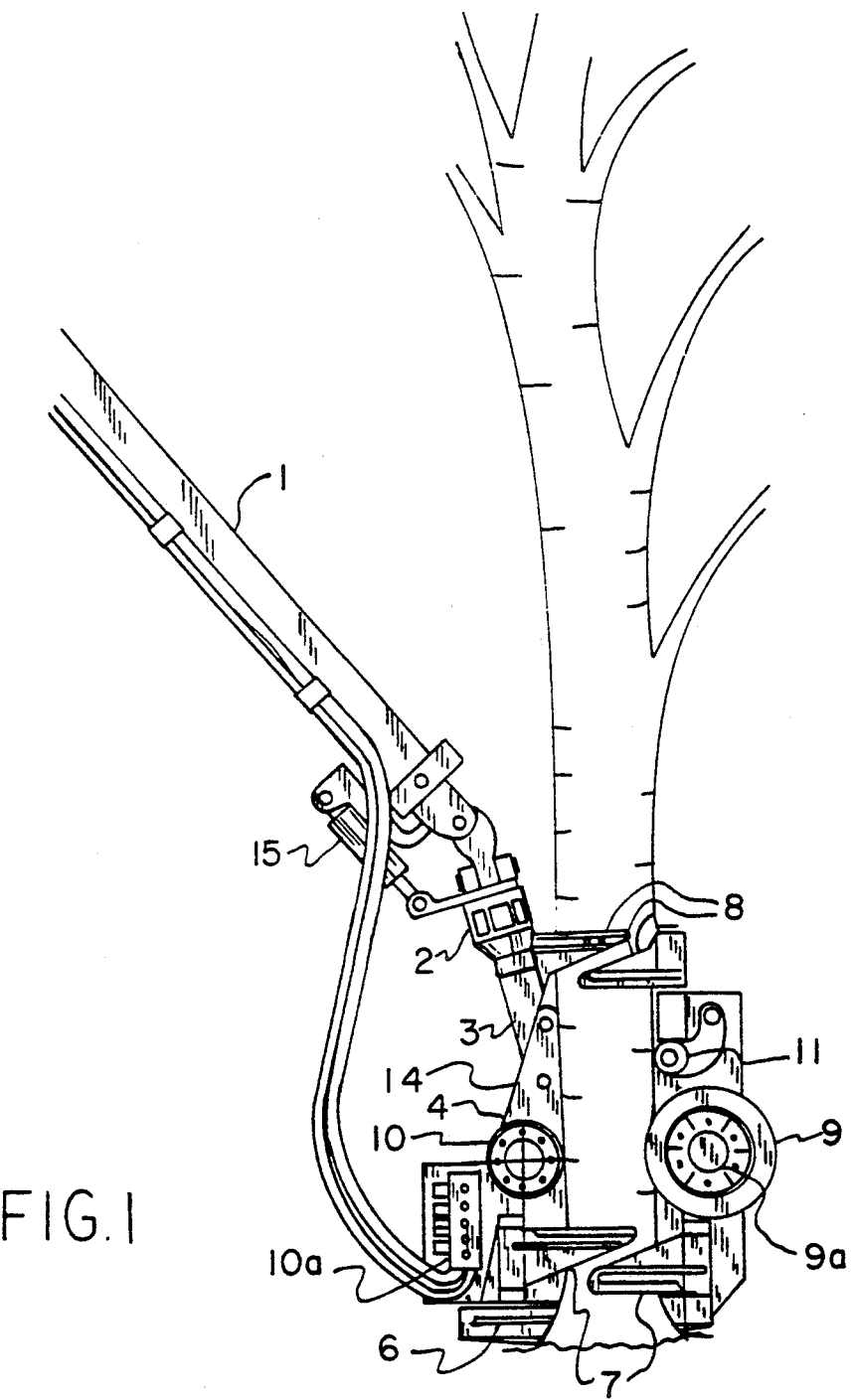
FIG. 1 shows an example of how the harvester in accordance with the invention grasps hold of a tree trunk for the purpose of felling.
Figure 2:
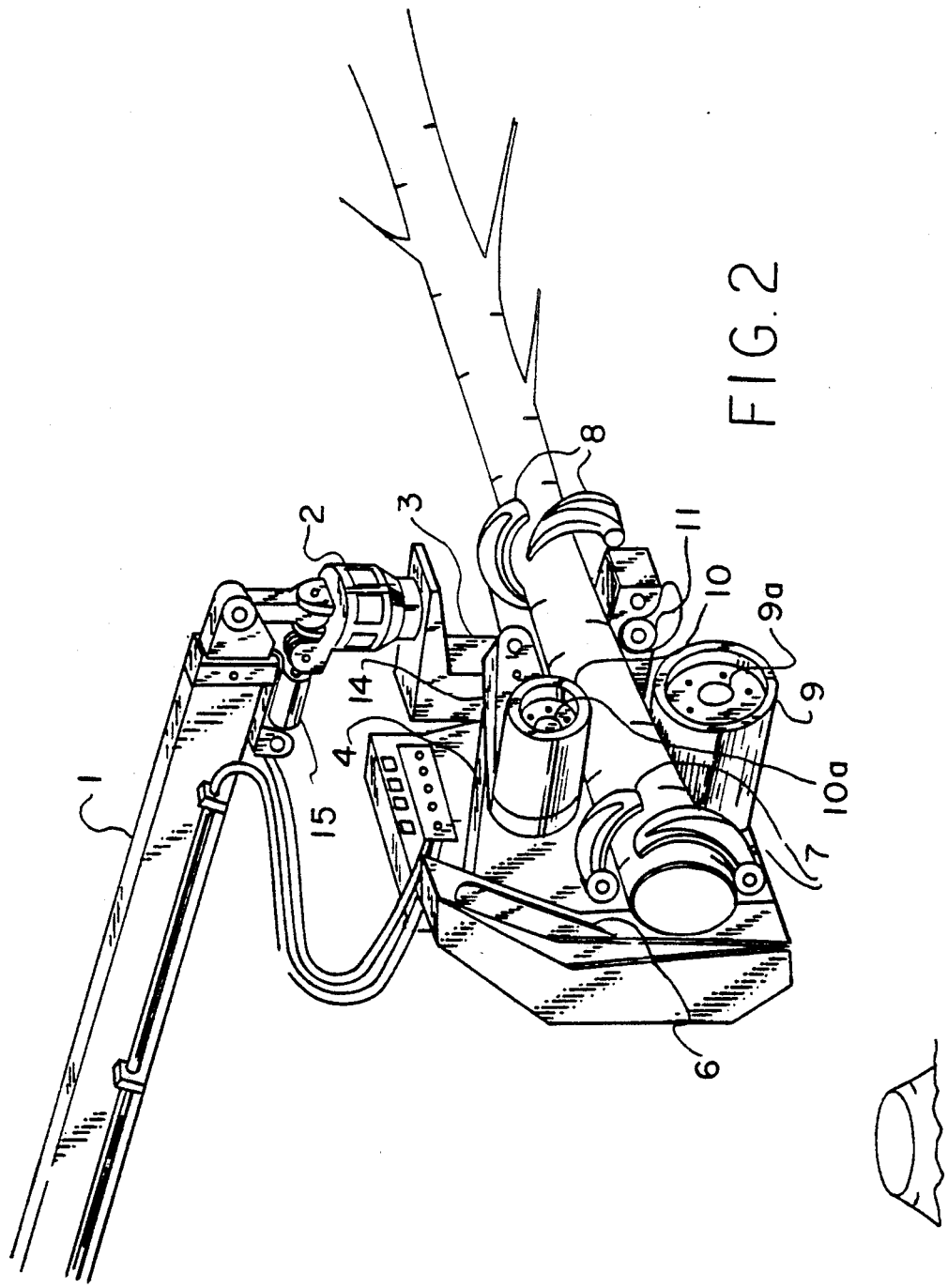
FIG. 2 is a perspective view of the harvester in the trimming and cross-cutting position.
Figure 3:
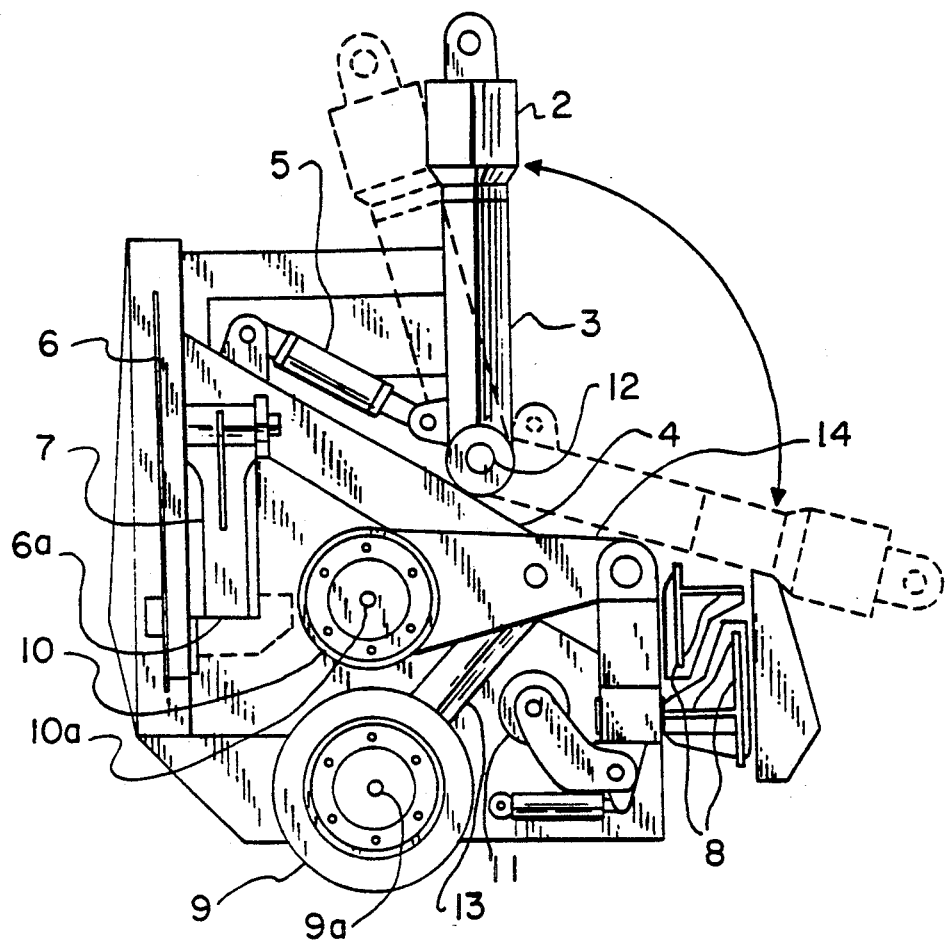
FIG. 3 is a side view of the harvester, seen in the axial direction of the drive rolls.
Figure 4:
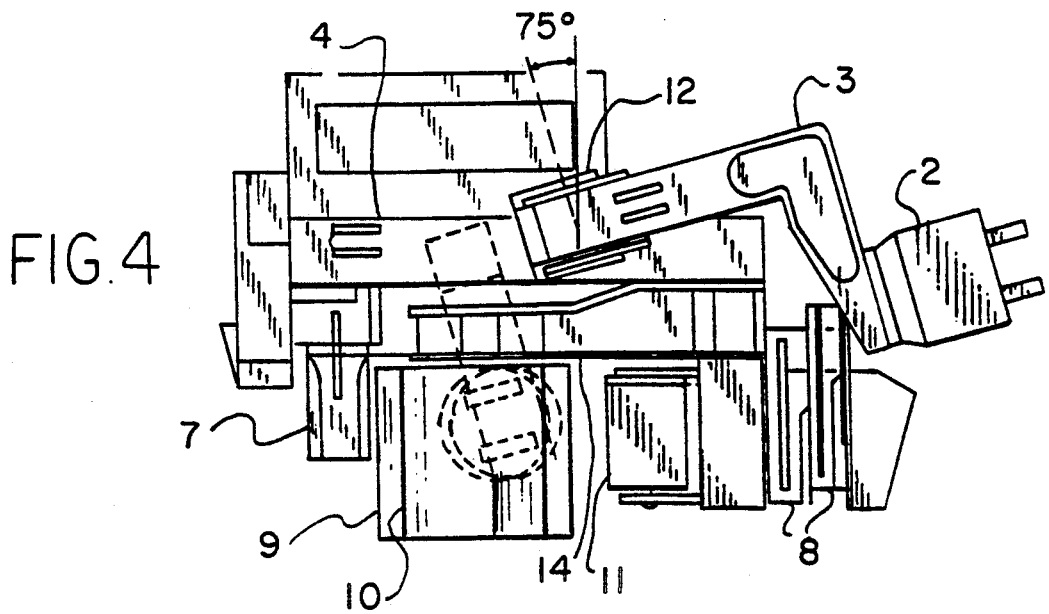
FIG. 4 shows the harvester of FIG. 3 from above.
Figure 5:
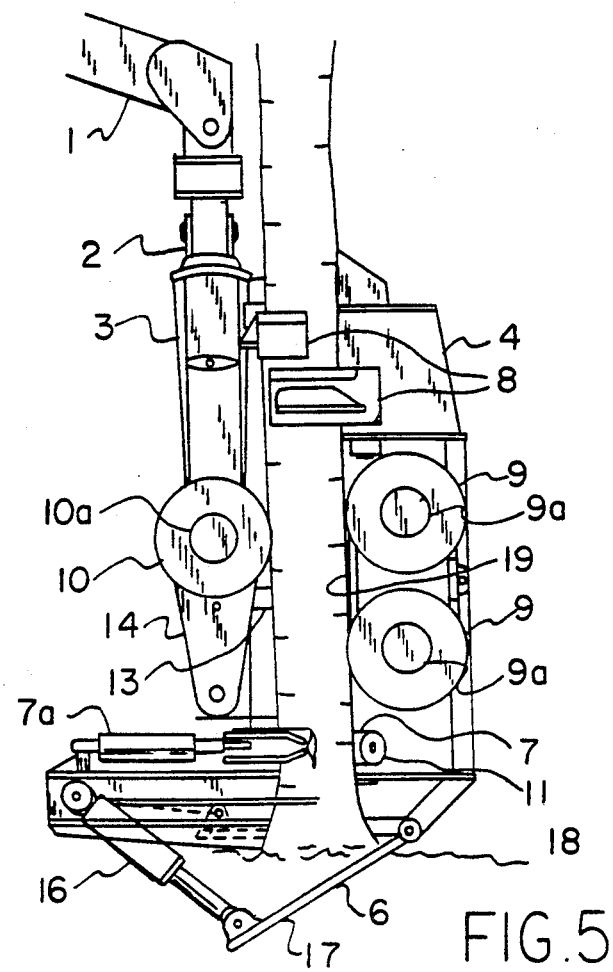
FIG. 5 shows another exemplifying embodiment of a harvester in accordance with the invention at the beginning of felling.
Figure 6:
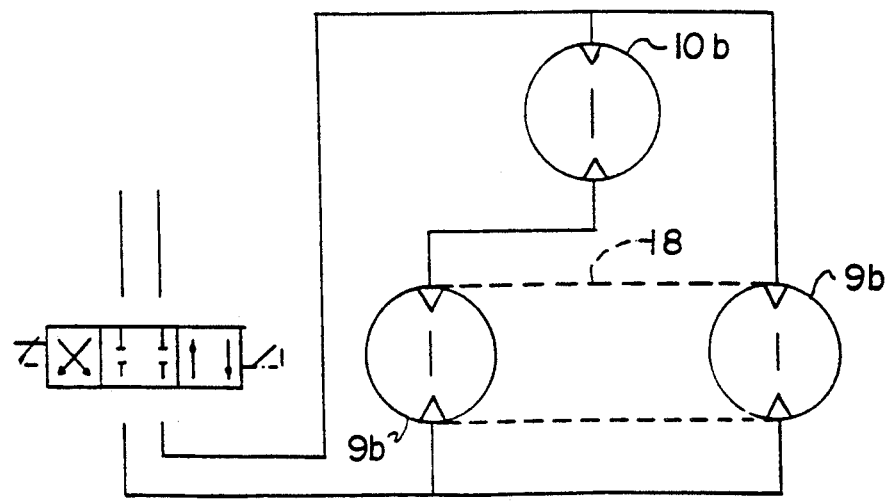
FIG. 6 shows the hydraulic diagram for the drive rolls of the harvester in accordance with FIG. 5.

The harvester in accordance with the present invention is of a type that is pivotally suspended at the end of a crane jib 1 and rotatable around its shaft of suspension preferably by means of a hydraulic rotator 2 for adjustment of the harvester in a correct position in relation to a tree to be felled. In order that an optimal balance should be obtained for the harvester, it comprises a suspension arm 3 substantially shaped as an inverted L, as comes out most clearly from FIGS. 2 and 4. At the lower end of the suspension arm 3, a processor unit 4 is mounted pivotally around a shaft 12. Between the processor unit 4 and the suspension arm 3, a hydraulic cylinder-piston device 5 is provided so as to produce the felling movement of the harvester. At its side facing away from the suspension arm 3, the processor unit 4 is provided with a cross-cutting member 6 adjoining its lower end and operating in a plane perpendicular to the main axis of the processor unit 4. Along side, two groups of trimming members 7, 8 are also provided, which groups are spaced from each other, in line with the cross-cutting member 6, and have operating planes parallel to that of the cutting member 6. One group of trimming members 7 is placed right next to the cutting member 6, and the other group of trimming members 8 is placed right at the top of the processor unit 4. Between the two groups of trimming members 7, 8, according to the embodiment shown in FIGS. 1 to 4, there is a pair of jointly operative drive rolls 9, 10 arranged with adjustable mutual spacing. In order that the timber could be cut off in predetermined lengths, the processor unit may also be provided with a measuring device 11, which is in contact with the tree trunk during the trimming and cutting stages. The cutting member 6, the trimming members 7, 8, and the drive rolls 9, 10 are provided with separate, preferably hydraulic drive units 6a, 7a, 9b, 10b, which receive their operating power, e.g., from a hydraulic pump on the vehicle, e.g. a forest tractor, on which the crane jib 1 is mounted.

The characteristic feature of the harvester in accordance with the invention is that the felling movement of the processor unit 4 is arranged to take place around the shaft 12 in a vertical plane so that the shafts 9a, 10a of the drive rolls constantly retain their substantially horizontal position, whereby a tree that is felled according to the present invention, remains lying on one of the drive rolls 9, as is shown in FIG. ... The shaft 12 is directed towards the processor unit 4 and is mounted on it so that a small acute angle, e.g. 15°, is formed between the vertical part 3 of the suspension arm 3 and the main axis of the processor unit 4. The advantage of having the shaft 12 positioned in this way is that thereby the horizontal part of the suspension arm 3 with the rotator 2 becomes placed somewhat behind the upper group of trimming members 8 when the harvester is in its vertical or starting position, which means that the suspension arm 3 does not interfere with a tree trunk during a felling operation and that, in the horizontal position of the harvester, the rotator 2 is placed substantially in a vertical plane passing through the joint center of gravity of the harvester and of the tree trunk resting on the drive roll 9, as is shown by dashed lines in FIG. 4. As the tree trunk rests primarily on the lower drive roll 9, which together with the upper drive roll 10, takes care of the transfer of the tree trunk through the harvester during the trimming stage. No increased friction arises between the trimming members 7, 8 and the tree trunk as a result of the weight of the tree trunk and of the clamping effect of the trimming members 7, 8 against the tree trunk. This is because the trimming members 7, 8 completely surround the tree trunk just very loosely. The lower drive roll 9, in the horizontal position of the harvester, is preferably mounted stationarily on the processor unit 4 to ensure an optimally stable drive, whereas the upper drive roll 10 is mounted on an arm 14 pivotable by means of a hydraulic cylinder-piston device 13. When the harvester is to be passed into engagement with a tree, the drive roll 10 is pushed by means of the hydraulic cylinder-piston device 13 to its maximum distance from the drive roll 9. At said working stage, the trimming members 7 and 8 in the two groups have also been passed to their extreme open positions. After the harvester has reached the correct position against the tree trunk, the trimming members 7, 8 are shifted into the working position so that they enclose the tree trunk, at the same time as the drive roll 10 is pressed by means of the cylinder-piston device 13 against the tree trunk, which is, at this stage, placed between the two drive rolls 9, 10. Hereby the best and, at the same time, the most non-destructive transmission of power is ensured between the drive rolls 9, 10 and the tree trunk in the trimming and cutting stages following after the felling.

In order to minimize the damage that arises on the tree trunk during transfer of the trunk through the harvester at the trimming stage, the hydraulic motors of both of the drive rolls should be preferably connected in series and, moreover, dimensioned so that with the same fluid flow they provide exactly the same peripheral velocity for each drive roll 9 and 10. Thus, by means of the connection in series, it is guaranteed that the speeds of the two drive rolls 9, 10 are always fully synchronized irrespective of any outside effect.

In order to prevent unintentional pivoting of the harvester at the articulated joint between the crane jib 1 and the rotator 2 and in order to facilitate application of the harvester against a tree trunk in spite of any branches, an extra hydraulic tilting cylinder-piston device 15 may be mounted appropriately across said articulated joint, said device having an attenuating effect on the swinging movement at the articulated joint in its free position, whereas, in the activated condition, the device sets and locks the articulated joint at a desired angular position.

According to the preferred embodiment of the harvester, it is provided with two stationary, equally large drive rolls 9 placed one after the other, a tree trunk being supposed to rest on the rolls 9 after felling, and the drive roll 10, mounted on the pivot arm 14, being arranged to rest against the top side of the tree trunk at a point between the contact points of the two lower drive rolls 9, so that a very stable fixing and reliable transfer of the tree trunk and, consequently, optimally uniform loading of the trimming members 7, 8 are obtained during the trimming stage.

The three drive rolls 9, 10 of the harvester are appropriately driven by hydraulic motors, whereat the hydraulic motor 10b of the drive roll 10, mounted on the pivot arm 14, is connected in series with the hydraulic motor 9b of one of the stationary drive rolls 9, and the hydraulic motor 9b of the other stationary drive roll 9 is connected in parallel with the hydraulic motors 9b and 10b of the other two drive rolls 9 and 10, at the same time as the two stationary drive rolls 9 are coupled together by means of an endless chain 19. By means of this arrangement it is guaranteed that all the drive rolls revolve exactly with the same peripheral speed.

In particular when the harvester is mounted, e.g., on a forest tractor of a light type, it often happens that the power at the crane jib, when it is in its extreme position, is not sufficient to produce an adequate lifting power for a felling movement. To amend this, at the bottom side of the processor unit 4 a felling flap 17 is mounted, which is acted upon by a hydraulic cylinder-piston piston device 16 and which is mounted as pivotable around a shaft 18 parallel to the shafts 9a, 10a of the drive rolls and placed substantially in line with the shafts 9a of the two stationary drive rolls 9, whereas the hydraulic cylinder 16 is mounted at the opposite end of the processor unit 4. The bottom of the felling flap 17 may be appropriately provided with a running wheel to facilitate pulling of a heavy tree trunk closer to the vehicle.

The harvester of the invention operates as follows:

The harvester is passed in the vertical position and with open trimming members 7, 8 and with folded-out drive rolls 9, 10 into contact with the lower part of a tree trunk. The groups of trimming members 7, 8 are then closed around the tree trunk and the drive rolls 9, 10 are pressed against the trunk and as the cutting member 6 is activated so that the trunk is cut-off at the root. At the last stage of the cutting, the felling cylinder-piston device 5 and, if necessary, the cylinder-piston device 16 are activated so that the tree is felled in the felling direction of the harvester and the lower part of the tree trunk remains resting on the stationary drive roll or rolls 9 of the harvester. The trimming phase is started thereby that the hydraulic motors 9b and 10b of the drive rolls 9, 10 are activated and feed the tree trunk in the longitudinal direction through the harvester, whereby the trimming members 8 perform a rough trimming and the trimming members 7 perform a "finishing" of the trunk. During feeding of the tree trunk the measuring device 11 records the length that has been fed and gives the cross-cutting member 6 a starting impulse when a preset length has been fed. After cross-cutting, the trimming of the following length is started, and these working steps are repeated until the whole tree trunk has been trimmed and cut in desired lengths.

While specific embodiments of the invention have been shown and described in detail to illustrate the application of the principles of the invention, it will be understood that the invention may be embodied otherwise without departing from such p...nciples.

What is claimed is:

1. A forest harvester for felling of a tree trunk and for trimming and cutting-off of the tree trunk in a horizontal position, said forest harvester being suspended pivotally at the end of a crane jib and rotatable around a shaft of suspension, and comprising:
   a suspension arm shaped substantially as an inverted L and a processor unit mounted pivotally around a pivot shaft at a lower end of said suspension arm, said pivot shaft being directed towards the processor unit, said processor unit having a front side facing away from the suspension arm and being provided with a cross-cutting member, two groups of trimming members placed at a distance from one another on said processor unit, at least two drive rolls jointly operative with each other, with variable mutual spacing, and mounted between said groups of trimming members, a felling movement of the processor unit arranged about said pivot shaft of the processor unit such that the drive rolls maintain their substantially horizontal position.

2. Harvester as claimed in claim 1, wherein the harvester is provided with two drive rolls arranged to rest against a tree trunk from opposite sides.

3. Harvester as claimed in claim 2, wherein the drive rolls are driven by hydraulic motors connected in series with one another.

4. Harvester as claimed in claim 3, wherein a lower of the drive rolls, in the horizontal position of the processor unit, is stationarily mounted on the processor unit and the upper of the drive rolls is mounted on an arm pivotable by means of a hydraulic cylinder-piston device.

5. Harvester as claimed in claim 1, further comprising two stationarily mounted drive rolls positioned one after the other on the processor unit and arranged to rest against a side of the tree trunk, which is in the felling movement of the processor unit, a further drive roll arranged to rest against another side of the tree trunk at a level between contact points of the two stationary mounted drive rolls, said further drive roll being mounted on an arm pivotable by means of a hydraulic cylinder-piston device.

6. Harvester as claimed in claim 5, wherein:
   the drive rolls are driven by hydraulic motors, a hydraulic motor of the drive roll mounted on the pivot arm and connected in series with a hydraulic motor of the other stationary drive roll connected in parallel with the hydraulic motors of the other two drive rolls, the two stationary drive rolls being coupled together by means of an endless chain.

7. Harvester as claimed in claim 4, wherein:
   the pivot shaft of the processor unit is mounted on said processor unit in such a way that, at the starting position of the processor unit, a small acute angle is formed between a vertical part of the suspension arm and a main axis of the processor unit.

8. Harvester as claimed in claim 7, wherein:
   the felling movement of the harvester is produced by means of a hydraulic cylinder-piston device coupled between the processor unit and the suspension arm.

9. Harvester as claimed in claim 8, further comprising:
   a felling flap movable by means of a hydraulic cylinder-piston device and pivotally mounted around a shaft fitted at a bottom side of the processor unit, said shaft being substantially parallel to the drive rolls.

10. Harvester as claimed in claim 8, wherein:
    the processor unit is provided with a measuring device for setting of a desired cutting length.

11. Harvester as claimed in claim 10, further comprising:
    a hydraulic rotator effecting the rotation of the harvester around its suspension shaft.

12. Harvester as claim in claim 11, further comprising:
    a hydraulic tilting cylinder-piston device adjusting an angle between the crane jib and the suspension arm.

13. A forest harvester comprising:
    a processor unit having a cross-cutting member;
    a first group of trimming members mounted on said processor unit;

a second group of trimming members mounted on said processor unit at a spaced location from said first group of trimming members;
first and second drive rolls mounted on said processor unit between said first and said second group of trimming members; and
suspension arm means connected to said processor unit for suspending said processor unit in a starting position, said starting position having said first and second rolls in a substantially horizontal position, said suspension arm means also suspending said processor unit in a trimming position with said first and said second rolls in a substantially horizontal position.

* * * * *